US005952613A

United States Patent [19]

Miettinen

[11] Patent Number: 5,952,613

[45] Date of Patent: Sep. 14, 1999

[54] CONNECTOR FOR CONNECTING A THREE-PHASE CABLE AND MANUFACTURING METHOD OF THE CONNECTOR

[75] Inventor: Erkki Miettinen, Helsinki, Finland

[73] Assignee: ABB Industry Oy, Helsinki, Finland

[21] Appl. No.: 08/836,321

[22] PCT Filed: Nov. 14, 1995

[86] PCT No.: PCT/FI95/00628

§ 371 Date: May 7, 1997

§ 102(e) Date: May 7, 1997

[87] PCT Pub. No.: WO96/19016

PCT Pub. Date: Jun. 20, 1996

[30] Foreign Application Priority Data

Dec. 13, 1994 [FI] Finland .................................... 945863

[51] Int. Cl.[6] ..................................................... H02G 15/02

[52] U.S. Cl. ....................... 174/74 R; 174/84 R; 174/89; 174/113 C; 439/98; 439/610

[58] Field of Search ................................ 174/84 R, 74 R, 174/78, 114 S, 113 C, 89; 439/98, 610, 585, 584

[56] References Cited

U.S. PATENT DOCUMENTS

| | | | |
|---|---|---|---|
| 1,904,162 | 4/1933 | Milliken | 174/78 |
| 2,538,019 | 1/1951 | Lee | 174/78 |
| 3,739,076 | 6/1973 | Schwartz | 174/78 |
| 3,830,957 | 8/1974 | Oberdiear | 174/78 |
| 4,022,966 | 5/1977 | Gajajiva | 174/65 |
| 4,243,290 | 1/1981 | Williams | 339/143 R |
| 4,420,202 | 12/1983 | Atakkam | 339/14 |

FOREIGN PATENT DOCUMENTS

| | | |
|---|---|---|
| 0112075 | 6/1984 | European Pat. Off. . |
| 0124695 | 11/1984 | European Pat. Off. . |
| 0391520 | 10/1990 | European Pat. Off. . |

*Primary Examiner*—Dean A. Reichard
*Assistant Examiner*—William H. Mayo, III
*Attorney, Agent, or Firm*—Birch, Stewart, Kolasch & Birch, LLP

[57] ABSTRACT

The invention relates to a connector and a manufacturing method thereof for a three-phase cable including concentric, segmentally disposed phase conductors (1) with surrounding insulation structures (11) and a concentric earth conductor (8) enclosing the phase conductors. According to the invention, the phase conductors (1) inside the connector are isolated from each other by a star-shaped dividing insulation piece (3) keeping the phase conductors (1) separate in their segments. Phase terminals (2) of the connector are disposed on the segment bottoms of the dividing insulation piece (3). The connector further incorporates a clamp (5, 7) suited for pressing the phase conductors (1) against the phase terminals (2) and a ferrule (10) on which the earth conductor (8) can be bent backward to mechanically lock a receptacle.

8 Claims, 1 Drawing Sheet

CONNECTOR FOR CONNECTING A THREE-PHASE CABLE AND MANUFACTURING METHOD OF THE CONNECTOR

BACKGROUND OF THE INVENTION

The present invention relates to a connector according to the preamble of claim 1 for connecting a three-phase cable.

The invention also concerns a manufacturing method for the connector.

Connection of a three-phase squirrel-cage or synchronous motor in inverter-driven systems is most frequently performed by means of a copper or aluminium cable having three symmetrically placed phase conductors surrounded by a common concentric earth conductor. Connection to the drive acting as the load is conventionally performed using a terminal block at low current levels and cable lugs at higher current levels. The concentric earth conductor is bundled into a "tail" diverted from the side of the cable and then connected using either of the above-mentioned termination methods.

Such a termination method has several shortcomings. Firstly, the joint unavoidably becomes long end bulky, because the phase conductors must be diverted apart from each other prior to the jointing. Secondly, at least four separate jointing steps must be carried out, three for the phase conductors and one for the earth conductor. In the case of segmental phase conductors, they must be dressed into a round shape before jointing. Besides the connections, the cable must be secured by means of a separate strain relief.

The phase and earth conductors, which are diverted apart from each other for the connection, form loops and radiating dipoles for the currents passing through them thus giving rise to stray inductances and emission of electromagnetic fields to their surroundings. To avoid such interference, the phase conductors should be arranged to run as symmetrically and as close to each other as possible. Furthermore, the length of the phase conductors exposed from under the concentric earth conductor should be minimized.

SUMMARY OF THE INVENTION

It is an object of the present invention to overcome the drawbacks of the above-described technology and to provide an entirely novel connector for connecting a three-phase cable and a method for manufacturing such a connector.

The goal of the invention is achieved by means of providing a purpose-designed symmetrical connector for connecting a cable in inverter-driven systems, in which connector the insertion of all three phase conductors into the connector occurs in a single jointing step and the earth connector is continued in its concentric form into the interior of the connector housing. Simultaneously, the concentric jointing of the earth conductor acts as the strain relief for the cable.

More specifically, the connector according to the invention is principally characterized by what is stated in the characterizing part of claim 1.

Furthermore, the method according to the invention is principally characterized by what is stated in the characterizing part of claim 3.

The invention offers significant benefits.

Jointing can be made in a single step. At the same time the jointing step provides an effective strain relief. Moreover, the embodiment according to the invention provides an electrical interference level much lower than that of conventional constructions. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following the invention will be examined in greater detail with reference to exemplifying embodiments illustrated in the appended drawings in which.

DESCRIPTION OF THE PREFERRED EMBODIMENTS

Figures 1, 2, 3, 4, 5, 6:
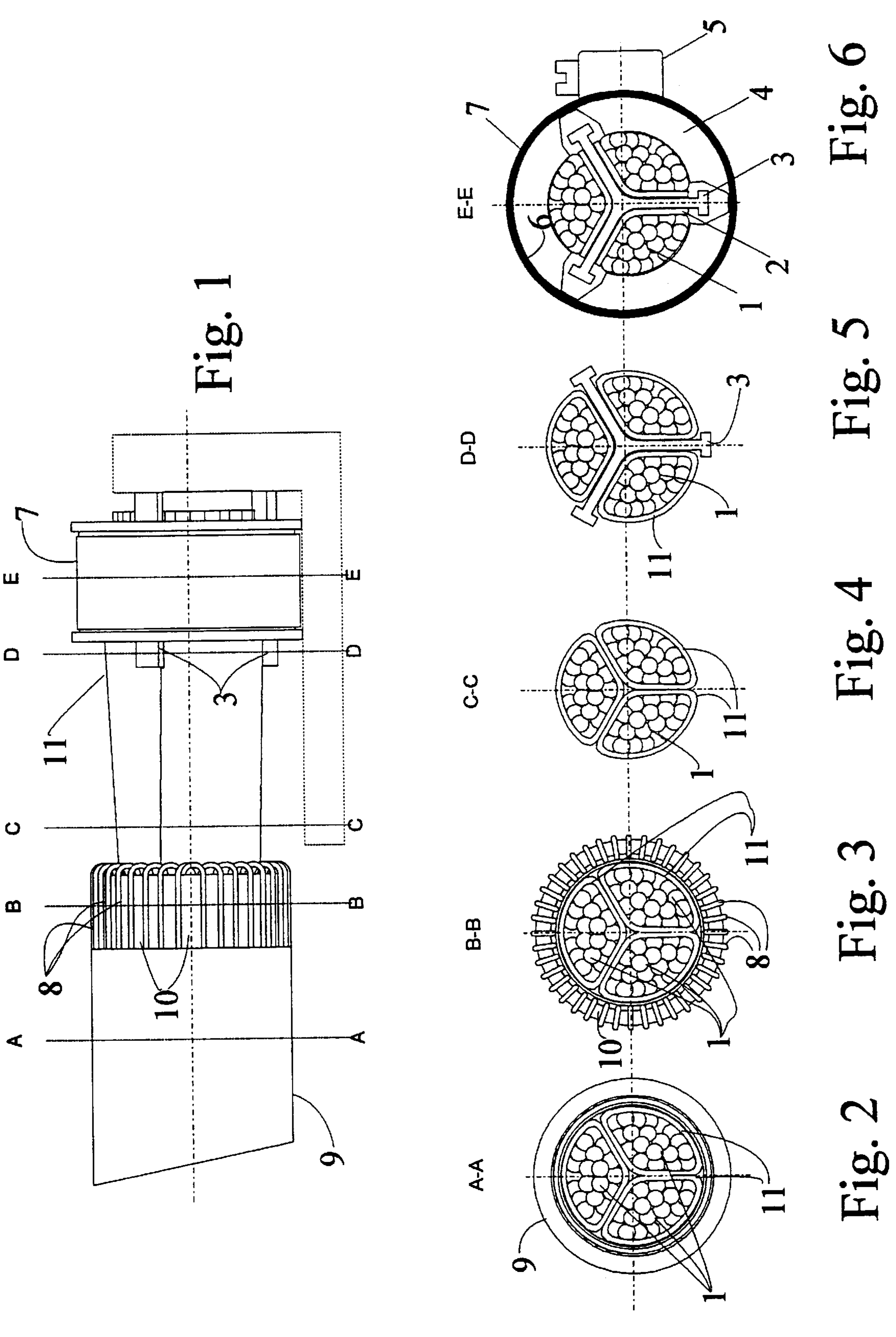
FIG. 1 is a side view of a connector according to the invention.
FIG. 2 is a cross-sectional view along the plane 2—2 of the connector shown in FIG. 1.
FIG. 3 is a cross-sectional view along the plane 3—3 of the connector shown in FIG. 1.
FIG. 4 is a cross-sectional view along the plane 4—4 of the connector shown in FIG. 1.
FIG. 5 is a cross-sectional view along the plane 5—5 of the connector shown in FIG. 1.
FIG. 6 is a cross-sectional view along the plane 6—6 of the connector shown in FIG. 1.

Referring to FIGS. 1–6, the connector according to the invention and the manufacturing method thereof are now described.

In contrast to conventional jointing methods, the phase conductors 1 of the cable will not be diverted apart for connection under parallel terminals. Instead, they are left in their natural positions and inserted unbent into a purpose-designed connector having a concentric structure, wherein the individual phase conductors 1 are disposed into circularly symmetrical segments of 120°. Referring to FIG. 6, the bottom in each segment terminal of the connector is shaped into a contact terminal 2 which is suited to make electrical contact with a phase conductor 1. In addition, the contact terminal 2 is continued as an isolated bar in the connector body and is finally connected to an inverter drive using appropriate means. The stripped lengths of the phase conductors 1 are radially compressed toward each other by means of a clamp or clamp proper 5 resembling a conventional hose clamp so as to provide good electrical contact between the phase conductors 1 and the segment terminals 2. Between the clamp ring 7 and the phase conductors 1 are adapted insulation pieces 4 and springed elements 6. The springed elements find use in the connection of aluminium conductor cables. Typically, the springed element 6 is a wave plate of spring steel to be placed between the clamp ring 7 and the insulation piece 4. The connector is typically encased in a metallic housing acting as an EMI shield, whereby the concentric earth conductor 8 is clamped to the feedthrough flange of the housing by means of a ferrule. The completed connection of the cable retains full symmetry and offers the best possible protection against EMI.

The work stages of connector manufacture are as follows:

1. Starting from the end of the cable, the plastic sheath 9 acting as insulation is removed over a length of approx. 50–150 mm, advantageously approx. 90 mm such that the concentric multiwire copper earth conductor 8 is exposed. A steel ferrule 10 is inserted onto the exposed length of the concentric conductor, at its very stem, onto which ferrule all the separate copper wires of the earth conductor are bent backward. The copper wires are trimmed at the point where the ferrule 10 rests against the plastic sheath 9. This arrangement serves for strain relief and direct connection of the earth conductor to the metallic body of the adapter-type connector.

2. Insulating plastic wrappings 11 covering the phase conductors 1 are removed and the ends of the segment-shaped phase conductors 1 are stripped free over a length of approx. 5–50 mm, advantageously approx. 20 mm. For an aluminium conductor cable, oxide is removed from the inner surfaces of the conductor in a conventional manner such as applying contact grease if necessary.

Outward bending of the phase conductors 1 is kept to the minimum save for the insulation and oxide removal steps of the conductors. At this stage, the cable end is ready for termination.

3. The exposed cable end with the segment terminals is pushed so deep into the connector as to align the earth conductor ferrule 10 with the center of the feedthrough flange of the EMI shield housing.
4. The phase conductors 1 are compressed against the segment terminals 2 with the help of the clamp 5 using a torque-indicating wrench to determine the proper tightening torque.
5. Finally, the upper part of the EMI shield housing is attached in place such that the earth conductor 8 of the cable remains compressed inside the feedthrough flange, whereby reliable electrical connection and good strain relief are established.

In the context of the invention, the EMI shield housing can be appropriately called the receptacle of the connector. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A connector for a three-phase cable having concentric, segmentally disposed phase conductors with surrounding insulation structures and a concentric earth conductor enclosing the phase conductors the connector comprising: a star-shaped dividing insulation piece for isolating the phase conductors inside the connector from each other, said star-shaped dividing insulation piece keeping the phase conductors separate in their segments;

phase terminals disposed on segment bottoms of said dividing insulation piece;

a clamp means for pressing the phase conductors against the phase terminals; and a ferrule on which the earth conductor is bent backward for mechanically locking the connector to a receptacle.

2. A connector as defined in claim 1, wherein said clamp means include a clamp ring and a clamp proper.

3. A connector manufacturing method for a three-phase cable comprising concentric, segmentally disposed phase conductors with surrounding insulation structures and a concentric earth conductor enclosing the phase conductors, the phase conductors being electrically connected to electrical terminals communicating with an electrical load and an end of the cable is stripped of insulation material enclosing the earth conductor the method comprising the steps of:

inserting a steel ferrule onto the earth conductor at a stem thereof;

bending backwards separate copper wires of the earth conductor;

trimming the copper wires at a point where the ferrule rests against a plastic sheath;

removing the insulation material covering the phase conductors;

stripping the ends of the phase conductors;

pushing an exposed end of the cable with segment terminals deep into the connector to align the ferrule of the earth conductor with a center of a feedthrough flange of a body structure of a receptacle;

pressing the phase conductors against segment terminals with clamp means; and attaching the connector to the receptacle so that the earth conductor of the cable remains pressed against the feedthrough flange, whereby reliable electrical connection and good strain relief are established.

4. A method as defined in claim 3, further comprising the step of removing the insulation of the earth conductor over a length of approximately 50–150 mm.

5. A method as defined in claim 3, further comprising the step of removing the insulation of the phase conductor over a length of approximately 5–50 mm.

6. A method as defined in claim 3 for completing the connector for an aluminium cable further comprising the step of removing oxide from inner surfaces of the phase conductors by applying contact grease.

7. The method as defined in claim 3, further comprising the step of removing the insulation of the earth conductor over a length of approximately 90 mm.

8. The method as defined in claim 3, further comprising the step of removing the insulation of the phase conductor over a length of approximately 20 mm.

* * * * *